Figure 1:
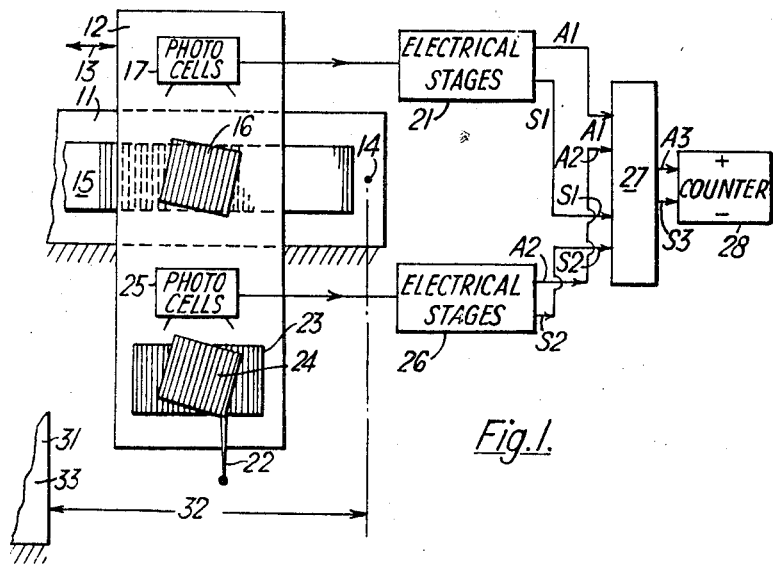

July 23, 1968　　　　H. OGDEN　　　　3,394,248
MEASURING APPARATUS
Filed June 21, 1965　　　　　　　　　　3 Sheets-Sheet 1

Inventor
HARRY OGDEN
By Cameron, Kerkam & Sutton
Attorneys

July 23, 1968     H. OGDEN     3,394,248
MEASURING APPARATUS
Filed June 21, 1965     3 Sheets-Sheet 2
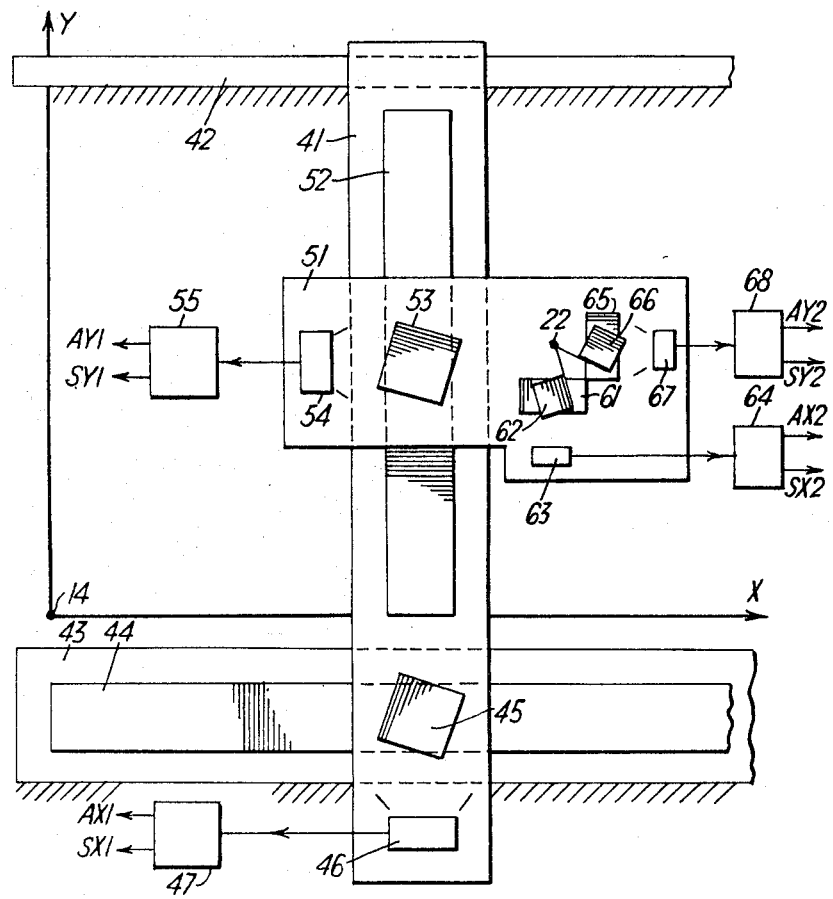
Fig.2.
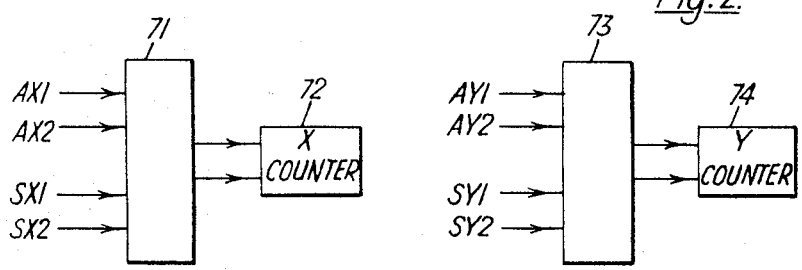
Inventor
HARRY OGDEN
By Cameron, Kerkam & Sutton
Attorneys July 23, 1968  H. OGDEN  3,394,248
MEASURING APPARATUS
Filed June 21, 1965  3 Sheets-Sheet 3
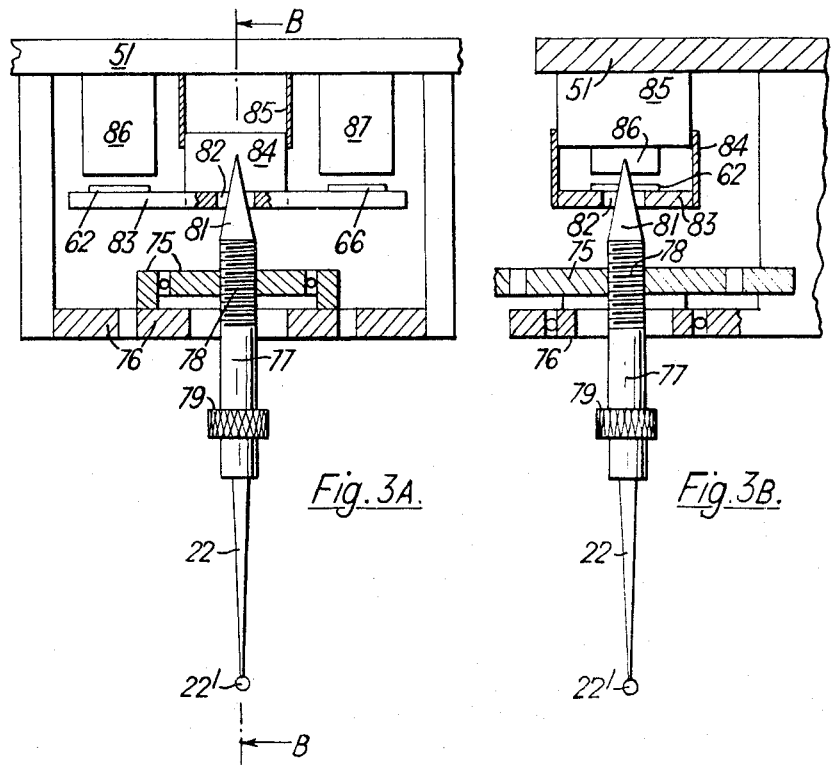
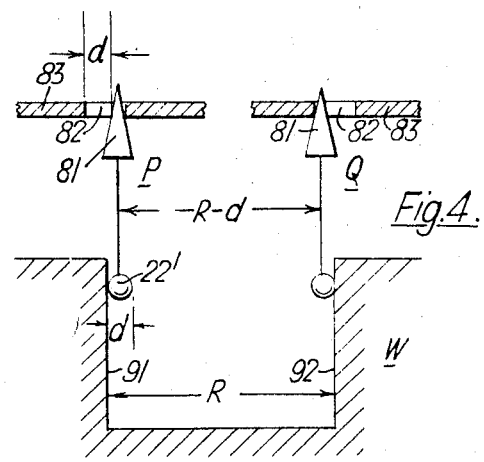
Inventor
HARRY OGDEN
By Cameron, Kerkam & Sutton
Attorneys

United States Patent Office 3,394,248
Patented July 23, 1968

3,394,248
MEASURING APPARATUS
Harry Ogden, Edinburgh, Scotland, assignor to Ferranti, Limited, Hollinwood, Lancashire, England, a company of Great Britain and Northern Ireland
Filed June 21, 1965, Ser. No. 465,692
Claims priority, application Great Britain, June 23, 1964, 25,835/64
6 Claims. (Cl. 235—92)

This invention relates to measuring systems of the kind employing optical gratings from which the measurement of the extent of a movement from a datum point is derived in digital form as a train of electrical pulses, each representing an elemental movement of predetermined extent. The pulses are applied to a bidirectional counter over an Add channel or a Subtract channel in dependence on the sense of the movement.

Where it is desired to measure in this way the movement of an object A relative to an object C, it is known to mount A on an intermediate object B which carries an index optical grating the movement of which with respect to a reference grating carried by C is measurable by a pulse count as described.

The object A may be a probe in apparatus for measuring the dimensions of a workpiece; in which case B is the probe carriage and C a fixed guideway which includes the datum point and along which the carriage B travels, the required measurement being the extent of the movement of the probe from the datum point. Or A may be a rotary cutter of a machine tool, B the fixed framework of the tool from which the cutter is journalled, and C a workpiece which is moved by the worktable with respect to both the cutter A and the fixed framework B; here the required measurement is the extent of the movement of the axis of the cutter with respect to a datum point on the workpiece.

Such arrangements sometimes have the disadvantage of not providing a sufficiently accurate reading owing to the fact that object A is not quite rigid with B, for it is sometimes desirable to allow a small movement of limited extent between them in the direction of the movement to be measured, or it may be impracticable to prevent it.

Thus where A is a probe, it is usually convenient to make it resiliently movable a little relative to the carriage to allow the probe to give way slightly when coming into contact with a workpiece surface and so obviate the need for precisely adjusting the carriage itself. And where A is a cutter it may be impracticable to journal it so rigidly to the tool framework as to prevent it from yielding slightly—thereby displacing its axis with respect to the framework—when engaging a heavy load. In either case the measurement of the movement of object B from the datum point on object C does not provide an accurate measurement of the movement of object A relative to C.

This disadvantage is duplicated where two-dimensional measurements are made by means of a single probe movable along mutually perpendicular X and Y axes, as described in more detail below, for if the probe is resilient in each of these directions the error due to that cause will occur in each measurement.

An object of the invention is accordingly to provide a measuring system of the kind described in which the disadvantage referred to is to a large extent absent.

In accordance with the present invention, a system for measuring the extent of a relative movement between an object A and a datum point carried by an object C includes an object B to which A is attached to allow a restricted relative movement between A and B in the direction of the first-mentioned movement, mounting arrangements to allow one of the two objects B and C to have sufficient movement relative to the other of those two objects to effect the required measurement, a main and an auxiliary optical grating system for effecting digital measurements of the extents of the movements between B and C and between A and B respectively, each system having an Add and a Subtract output channel and being arranged to provide each measurement in the form of electrical pulses representing elemental extents of the movement and applied to the Add or the Subtract channel in dependence on the sense of the movement, a bidirectional counter, and connections from the chanels to the counter for causing the count to provide a measurement of the extent of the relative movement between A and C.

Figure 5:
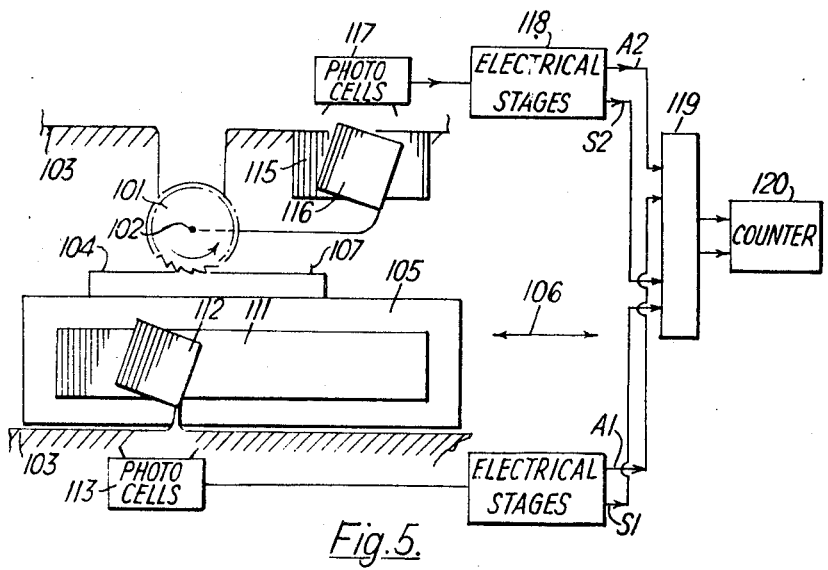

In the accompanying drawings,

FIGURES 1, 2, and 5 are diagrams in simplified and partly schematic form of three embodiments of the invention, FIGURES 3a and 3b show details of a part of the embodiment of FIGURE 2, and FIGURE 4 illustrates the operation of the apparatus of FIGURE 3.

The invention will first be described by way of example as applied to a one-dimensional measuring system using a probe. In carrying out the invention in this form, see FIGURE 1, a fixed guideway 11 includes mounting arrangements to enable it to support a carriage 12 for movement along the guideway in one or other of the opposite directions indicated by the arrows 13. Thus the objects A, B, and C are the probe, the carriage, and the fixed guideway.

The measurement of the carriage position along the guideway with respect to a datum point 14 is effected by a main optical grating system. This includes a reference grating 15 fixed to the guideway and extending over the length of carriage movement required. In co-operation with grating 15 is an index grating 16 fixed to the carriage. The gratings are ruled equally with grating 16 slightly skew so that the combination sets up a pattern which moves in a direction normal to that indicated by arrows 13 as the carriage moves along the guideway. The pattern is looked at by a bank of photocells indicated generally at 17. The outputs from the cells are applied to electrical stages 21 arranged to derive an electrical pulse for each elemental movement of the carriage and apply that pulse to an Add output channel A1 or to a Subtract output channel S1 according to the sense of the movement. It is assummed that for movements of the carriage away from the datum point—that is, from right to left as seen in the drawing—the pulses are applied to the Add channel, whereas for movement in the opposite direction the pulses are applied to the Subtract channel. The invention is not concerned with the particular form of optical grating system used. A suitable system, including gratings 15 and 16 together with stages 17 and 21, may however be as described in U.S. patent specification No. 2,886,717 or No. 2,886,718.

The probe itself, indicated at 22, is mounted from the carriage 12 by arrangements (not shown) which allow a restricted resilient movement of the probe relative to the carriage in each of the directions 13. To measure such restricted movements of the probe relative to the carriage there is provided auxiliary optical grating system similar to the main grating system described in the preceding paragraph. It includes an auxiliary reference grating 23 fixed to the carriage and a co-operating auxiliary index grating 24 fixed to the probe; grating 23 is long enough to span the restricted movement of the probe. The pattern set up by the gratings is looked at by a bank of photocells 25 the output from which are applied to electrical stages 26; from these stages electrical pulses are applied to one or other of two output channels. Here the convention adopted is that the pulses are applied to an Add channel A2 when the probe movement with respect to the carriage is away from datum point 14, and to a Substract channel S2 when the probe movement is in the other direction.

The four channels are combined in a network 27 the output from which is applied to the Add and Subtract inputs A3 and S3 of a bidirectional counter 28. Network 27 is arranged in any convenient manner to ensure that no two pulses from different channels are lost through being presented to the counter too quickly for it to accept them. The invention is not concerned with the particular network used for this purpose, but a convenient form of it is described with reference to FIG. 5 of co-pending U.S. patent application No. 459,371.

In operation, it is assumed by way of example that the measurement of a dimension of a workpiece 31, which is fixed with respect to the guideway, includes the step of measuring the distance 32 from datum point 14 to a surface 33 of the workpiece which defines one end of the dimension to be measured. To complete the measurement it is also necessary to measure the distance from the datum point to that workpiece surface which defines the other end of the dimension to be measured, the difference between the two measurements giving the one required; but as this procedure is closely similar to the one about to be described it will not be referred to further.

To measure the distance 32, the carriage 12 is moved away from the datum point so as to bring the tip of probe 22 into contact with surface 33. During this movement, the main grating system passes pulses into the counter in proportion to the movement of grating 16 relative to grating 15 and hence of the carriage relative to the datum point. As the movement is away from the datum, the pulses are passed to the counter over the Add channels A1 and A3, on the convention assumed above.

No movement of the probe occurs relative to the carriage, and hence no pulses are passed to the counter from the auxiliary grating system, until the probe touches surface 33. If it were possible to arrest the carriage at this exact point—that is, with the probe tip just lightly touchings surface 33—the pulses which by then had been passed to the counter by the main grating system would give a correct digital measurement of the distance 32. To ensure, however, that the probe tip does in fact touch surface 33, it is usually necessary to overrun the carriage slightly, thereby increasing the pulse total, as derived from the main grating system, beyond the correct value. The resilient mounting of the probe from the carriage allows the carriage to overrun to this slight extent without breaking or flexing the probe, the excessive movement of the carriage being accompanied by an equal and opposite movement of the probe and index grating 24 relative to the carriage. In response to this movement, the auxiliary grating system passes pulses to the counter; as the movement (of probe relative to carriage) is towards the datum, the pulses are passed into the counter in the substractive sense over channels S2 and S3, thereby reducing the count to the exact extent of the overshoot of the carriage. Alternatively, in the circumstances described in the co-pending application, each subtractive pulse from the auxiliary system may cancel out, in stage 27, an additive pulse from the main system, so that neither reaches the counter. Thus the counter reading affords a digital measurement of the extent of probe movement relative to the datum point, and hence of distance 32, corrected for the movement of the probe relative to the carriage.

The function of network 27, as fully described in the co-pending application, is to ensure that the counter reading is not rendered erroneous through pulses which reach it at too close spacings for it to accept them.

Where measurements in two directions at right angles to one another are required to be made by means of the one probe, the measuring system may be as shown in FIG. 2. For convenience, the system is depicted in plan, with the probe 22 vertical and the various gratings all in horizontal planes. For further convenience, the datum point 14 is considered as the origin of a Cartesian coordinate system in a horizontal plane so that the measurements to be effected are the X and Y coordinates of whatever point the probe is engaging.

The arrangement includes an X carriage 41 carried by guideways 42 and 43, which are fixed relative to the coordinate system, for movement in the X direction. This movement is measured by a main X optical grating system including a reference grating 44 extending along one of the guideways—guideway 43, say—and a cooperating index grating 45 secured to carriage 41. The pattern set up by these gratings is looked at by a bank of photocells 46 the output from which is used to produce a digital measurement of the movement of the X carriage along the X axis by electrical stages 47 which supply pulses to an Add output channel AX1 or a Subtract output channel SX1 according as the movement of the X carriage is away from the datum point 14 or towards it.

The X carriage 41 supports for movement along it in the Y direction a Y carriage 51 the position of which along the Y axis is measured by a Y main grating system including a reference grating 52 along the X carriage, a co-operating index grating 53 on the Y carriage, a photocell bank 54, and electrical stages 55, which direct pulses into an Add or a Subtract output channel AY1 or SY1 according as the movement of the Y carriage is away from or towards the datum point 14.

Both the X and the Y main grating systems are closely similar to the main grating system of the embodiment first described and so need not be particularised further.

The probe 22, as already mentioned, is vertical and may therefore be thought of as extending downwards from the plane of the paper and normal to it. The probe is mounted from the Y carriage 51 so as to allow of a restricted resilient movement of the probe relative to carriage 51 in each of the X and Y directions. To measure such movements, X and Y auxiliary grating systems are provided.

The X auxiliary system includes a reference grating 61 secured to carriage 51 to extend in the X direction, a co-operating index grating 62 secured to the probe, a photocell bank 63, and electrical stages 64 whereby pulses are directed into an Add output channel AX2 or a Subtract output channel SX2 according as the probe movement relative to carriage 51 in the X direction is away from or towards the datum point.

The Y auxiliary system similarly includes a reference grating 65 secured to carriage 51 but extending in the Y direction, a co-operating index grating 66 secured to the probe, a cell bank 67, and stages 68 whereby pulses are directed into an Add or a Subtract output channel AY2 or SY2 according as the probe movement relative to carriage 51 in the Y direction is away from or towards the datum point.

Channels AX1, AX2, SX1, and SX2 are connected to a combining network 71, similar to network 27, the output from which is applied to a bidirectional counter 72 associated with the X direction. Similarly the Y channels are connected by way of a network 73 to a counter 74 associated with the Y direction.

The operation of this equipment in respect of each of the X and Y axes is closely similar to that of the embodiment first described. In the present arrangement, however, two measurements are provided rather than one, the two being the X and Y coordinates, as indicated by counters 72 and 74, of whatever point the probe is engaging. The resilient mounting of the probe permits both carriages to overshoot to the extent allowed by the restricted probe movement, and each overshoot is compensated for by pulses derived by the corresponding auxiliary grating system and the associated electrical stages, so that the number of pulses held by the counter concerned gives a corrected measurement in the associated direction.

Alternatively, some or all of the gratings may lie in planes normal to that of the coordinate system, their being all depicted parallel to it in FIG. 2 being merely for the sake of clarity. Similarly the plane of the coordinate system need not be horizontal.

In a preferred arrangement of the auxiliary gratings, the rulings of the index gratings 62 and 66 are aligned exactly in the Y and X directions respectively, each of the reference gratings 61 and 65 being skewed with respect to the associated index grating to provide the pattern. With this arrangement a movement of the probe in, say, the X direction only moves the Y auxiliary index grating parallel to its own rulings and so does not produce any change in the pattern set up by the Y auxiliary system. Similarly for movements in the Y direction.

A convenient form of lost-motion mounting for the probe to allow of its auxiliary movement in both directions with respect to carriage 51 with compensation for the diameter of the probe tip will now be described with reference to FIG. 3, which shows at A a partial section looking in a direction parallel to the X axis and at a B partial section on the line B, B of FIG. 3a and hence looking in a direction parallel to the Y axis.

The probe is mounted from carriage 51 by compound ball-bearing slideways 75 and 76 which are freely movable to allow of a small movement of the probe relative to the carriage in the X and in the Y direction respectively. The probe base 77 is threaded at 78 and is attached to slideway 75 by being screwed into it. The probe proper, 22, is attached to its base 77 by a screwed clamp 79 which allows the use of a variety of probes having different diameters of the tip $22^1$. The upper end of probe base 77 is a cone 81 which extends into a square aperture 82 in the grating carrier 83. Carrier 83 is mounted from carriage 51 by leaf springs 84 and 85 to allow a limited resilient movement of the carriage relative to the carrier in the X and in the Y direction respectively after the movement of the probe has been arrested by its coming into contact with a workpiece. The auxiliary index gratings are secured to the respective ends of carrier 83; as seen in FIG. 3a, grating 62 is secured to the left-hand end of the carrier and grating 66 to the right-hand end. The corresponding auxiliary reference gratings and associated electrical stages are contained in optical blocks 86 and 87. The overall clearances in each direction between the cone end 81 of the probe and the sides of the square aperture 82 are each equal to the diameter of the probe tip $22^1$. To adjust these clearances to suit probes of different diameter tips, the probe base 77 is rotated, thereby screwing it upwards or downwards with respect to slideway 75 and so varying the extent of the insertion of cone 81 in aperture 82.

The action of this form of mounting in compensating for the probe tip diameter is shown in FIG. 4 where an internal dimension of value R is to be measured between facing surfaces 91 and 92 of a workpiece W, the diameter of the probe tip having the value $d$. To effect this measurement, carriage 51 (and with it carrier 83) are moved from right to left, as seen in the drawing, to bring the probe tip into contact with surface 91. A slight additional movement of the carriage in this direction, to ensure contact of the probe tip, first brings the right-hand side of aperture 82 against the conical end 81 of the probe, assuming the two are not already in contact, and then, with carrier 83 now fixed relative to the probe, moves carriage 51 relative to the probe and carrier against the slight force of the appropriate one of leaf springs 84 and 85. The condition of the probe with respect to carrier 83 is then as shown at P, with the clearance $d$ between conical end 81 and the left-hand side of aperture 82.

The carriage is now moved from left to right so as to carry the probe across to the other surface 91. The first part of this movement is lost motion between carrier 83 and the probe for a distance $d$, to carry the left-hand side of aperture 82 into engagement with the probe, as shown at Q. When the probe tip has reached surface 92, the extent of the movement of the probe centre has not been R but $(R-d)$. Carrier 83 has however moved further than this to the extent of the lost motion $d$. Thus the carrier movement has the true value R to be measured.

Similar compensation for the probe tip diameter is effected where the dimension to be measured is an external one.

The probe mounting arrangements of FIG. 3, simplified to one dimension, may also be used for the system of FIG. 1. Only one guideway, movable relative to the carriage 12 in the direction 13, is now required. Similarly the grating carrier is mounted from the carriage for restricted resilient movement in only that direction, and carries only auxiliary index grating 24. As the aperture is only to define probe movements in the one direction, one pair of its opposite sides is not made use of; hence it need only be rectangular, not necessarily square. Similarly the portion of the probe which extends into the aperture may be wedge-shaped, in that direction, rather than conical.

The application of the invention to a machine tool which is liable to displacements of a cutter under a heavy load may be as shown in FIG. 5. Here a rotary cutter 101 is journalled for rotation about its axis 102 in bearings which are not shown but which are secured to the fixed framework 103 of the machine. The cutter is depicted as engaging a workpiece 104 carried by mounting arrangements in the form of a worktable 105 arranged to be driven by a motor and leadscrew, neither of which is shown, in the directions indicated by the arrows 106 with respect to the frame 103. The cutter, framework, and workpiece are the objects A, B, and C above mentioned.

The position with respect to the frame 103 of a datum point 107 which is on the workpiece and hence is fixed with respect to the worktable is measured by a main grating system which includes a reference grating 111 carried by the table and an index grating 112 fixed to the frame. The pattern is looked at by a bank of photocells 113 the outputs from which are applied to electrical stages 114 to generate pulses for application over an Add channel A1 or a Subtract channel S1 according to the sense of the movement of the worktable. It will be assumed that the pulses are applied to the Add channel when the table is moving from right to left, as seen in the drawing, but to the Subtract channel when the table is moving in the opposite direction.

The actual measurement required is that of the axis 102 of the cutter with respect to the datum point 107 on the workpiece. If the cutter were journalled so rigidly to the frame as not to permit of relative movement between them, the required measurement could be accurately obtained from that of the travel of the worktable with respect to the frame, and hence with respect to the cutter axis, as derived by the main grating system. Where however the cutter is subjected to a heavy load, such as workpiece of especially hard material or requiring an especially deep cut, it is usually impracticable to journal the cutter so rigidly as to prevent its axis from being displaced to some extent in the direction of the worktable movement. In such circumstances the main grating system does not give the correct reading required.

In accordance with the invention, such displacement of the cutter is accepted, and a measurement of it is made by an auxiliary grating system to correct that of the main system.

Thus auxiliary system includes a reference grating 115 secured to the fixed framework 103 of the machine and a co-operating index grating 116 producing a pattern which is looked at by a bank of cells 117. The cell outputs are converted into pulses by electrical stages 118 which supply them over an Add channel A2 where axis 102 is moving from left to right, as seen in the drawing, but over a Subtract channel S2 where the movement is in the opposite direction.

The four channels are combined at a network 119, similar to network 27 of FIG. 1, the output of which is applied to the Add or Subtract channels of a bidirectional counter 120.

Both the main and the auxiliary grating systems are closely similar to those described above with reference to FIG. 1 or FIG. 2.

In operation, it will be assumed to begin with that the worktable is moving from right to left, as seen in the drawing, so that the pulses derived from the main grating system are directed to the counter in the Add sense. It is assumed further that the workpiece is of such hard material as to cause a slight displacement of axis 102 of the cutter. This displacement is necessarily in the direction of the table movement—that is, from right to left. Accordingly the pulses that are generated by the auxiliary grating system in dependence on the extent of this movement are directed to the counter in the Subtract sense. Now the effect of this displacement is that the measurement by the main grating system of the movement of datum point 107 with respect to axis 102 is in excess of the correct value—axis 102 having moved away a little as point 107 approached it. The effect of the Subtract pulses supplied by the auxiliary system is to reduce the measurement of the distance between point 107 and axis 102 to the correct value.

Similarly if the table movement is from left to right, the only difference being that the pulses from the main system are now in the Subtract sense whereas those from the auxiliary are in the Add sense.

What I claim is:

1. A system for measuring the extent of a relative movement between an object A and a datum point carried by an object C including an object B to which A is attached to allow a restricted resilient relative movement between A and B in the direction of the first-mentioned movement, mounting arrangements to allow one of the two objects B and C to have sufficient movement relative to the other of those two objects to effect the required measurement, a main and an auxiliary optical grating system for effecting digital measurements of the extents of the movements between B and C and between A and B respectively, each system having an Add and a Subtract output channel and being arranged to provide each measurement in the form of electrical pulses representing elemental extents of the movement and applied to the Add or the Subtract channel in dependence on the sense of the movement, a bidirectional counter, and connections from the channels to the counter for causing the count to provide a measurement of the extent of the relative movement between A and C.

2. A system as claimed in claim 1 wherein the object A is a probe, the object C is a fixed guideway, and the object B is a probe carriage which is supported from the guideway by said mounting arrangements.

3. A system as claimed in claim 2 which further includes as a part of the auxiliary grating systems a grating carrier supported by the probe carriage to allow a restricted resilient movement of the grating carrier in said direction relative to the carriage and to another part of the auxiliary grating system, the carrier having a rectangular aperture, and the probe having a coned or wedge-shaped portion extending into that aperture and being so supported on a guideway freely movable in said direction relative to the carriage as to allow the extent of insertion of the coned or wedge-shaped portion in the aperture to be adjustable, thereby allowing the clearance between that portion and the sides of the aperture in said direction to be made equal to the dimensions of the probe tip in that direction.

4. A system as claimed in claim 1 wherein the object A is a cutting member of a machine tool, the object C is a workpiece carried by said mounting arrangements in the form of a worktable, and the object B is the fixed framework of the tool.

5. A system for measuring the extent of a movement of a probe in each of the X and Y directions of a Cartesian coordinate system relative to a datum point at the origin of the system including an X carriage movable in the X direction, a Y carriage supported by the X carriage for movement in the Y direction and carrying the probe so as to allow a restricted resilient movement of the probe with respect to the Y carriage in each of the X and Y directions, X and Y main optical grating systems for respectively effecting digital measurements of the movements of the carriages in the X and Y directions relative to the datum point, X and Y auxiliary optical grating systems for respectively effecting digital measurements of the resilient movements of the probe in the X and Y directions relative to the Y carriage, each of said systems having an Add and a Subtract output channel and supplying the measurement in the form of electrical pulses representing elemental extents of the movement of the carriages or probe, as the case may be, in the direction concerned and over the Add or the Subtract channel of the system in dependence on the sense of the movement, X and Y bidirectional counter, and connections from the output channels of the X and Y systems to the X and Y counters for causing each count to provide a digital measurement of the extent of the probe movement in the direction concerned relative to the datum point.

6. A system as claimed in claim 5 which further includes as a part of the auxiliary grating systems a grating carrier supported by the Y carriage to allow a restricted resilient movement of the grating carrier in each of the X and Y directions relative to the carriage and to other parts of the auxiliary grating systems, the carrier having a square aperture, and the probe having a coned portion extending into that aperture and being so supported from the carriage on guideways freely movable in the X and Y directions relative to the carriage as to allow the extent of insertion of the coned portion in the aperture to be adjustable, thereby allowing the clearance between the coned portion and the sides of the aperture to be made equal to the diameter of the probe tip.

References Cited

UNITED STATES PATENTS

| | | | |
|---|---|---|---|
| 2,907,937 | 10/1959 | Apgar | 318—20.260 |
| 2,907,938 | 10/1959 | Hodgers | 318—20.260 |
| 2,918,215 | 12/1959 | Root | 235—92 |
| 3,104,349 | 9/1963 | Stevens | 318—20.520 |

MAYNARD R. WILBUR, *Primary Examiner.*

G. J. MAIER, *Assistant Examiner.*